Aug. 1, 1967 A. R. ILLINGWORTH 3,334,216
ELECTRICALLY HEATED COVERING
Filed Nov. 23, 1964
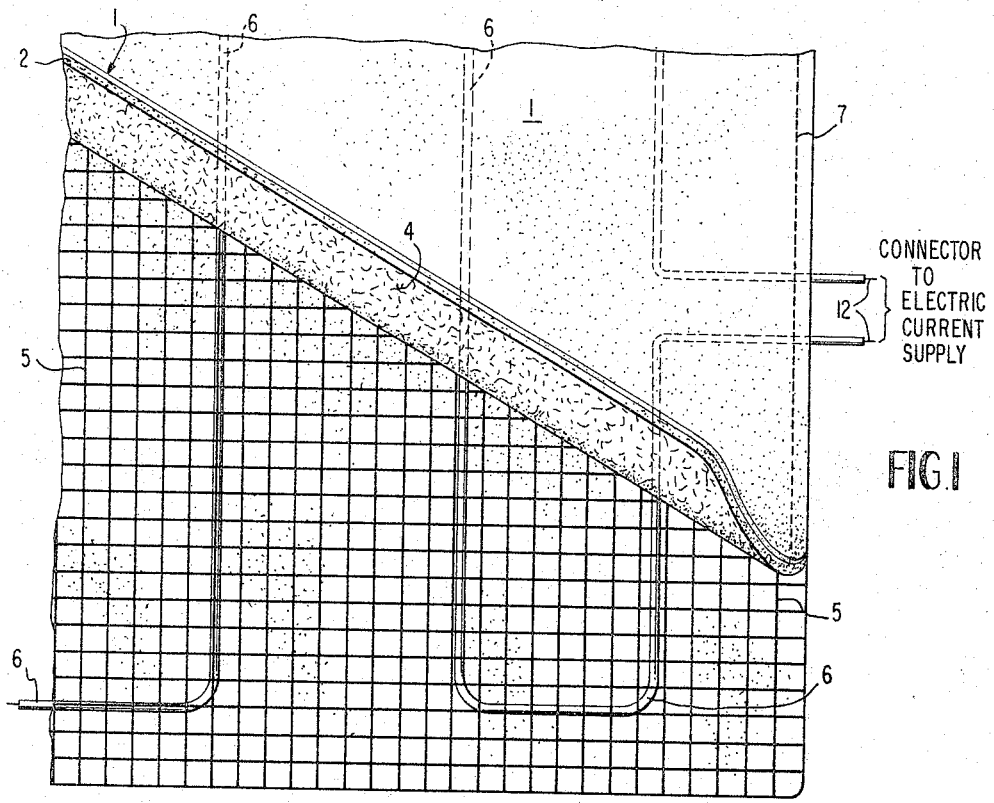
FIG. 1
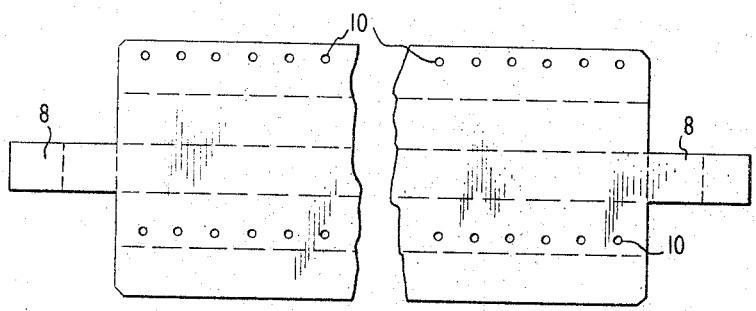
FIG. 4
FIG. 5
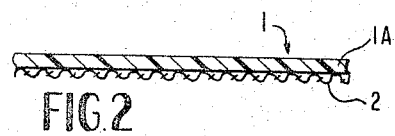
FIG. 2
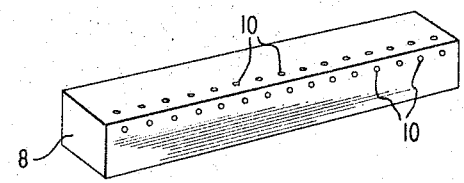
FIG. 3
INVENTOR
ALEX RONALD ILLINGWORTH
BY
*Abraham A. Saffitz*
ATTORNEY

United States Patent Office 3,334,216
Patented Aug. 1, 1967

3,334,216
ELECTRICALLY HEATED COVERING
Alec R. Illingworth, Wingfield, High Utley,
Keighley, England
Filed Nov. 23, 1964, Ser. No. 412,943
Claims priority, application Great Britain, Nov. 22, 1963,
46,141/63, 46,142/63
3 Claims. (Cl. 219—528)

The invention has as its object the provision of new or improved electrically heated sheeting, covering and like materials such as tarpaulins, for any suitable purpose. For instance, sheeting according to the invention may be employed for enclosing or covering various articles of mecrchandise during either storage or transportation for ensuring that such merchandise may be maintained at predetermined temperature for such purposes as the preservation, curing, drying or maturing of the merchandise and the hardening of concrete or the seasoning of wood or timber.

According to a preferred embodiment of the invention, the electrically-heated sheeting, covering and like material comprises two primary members or outer waterproof layers or plies of material between which layers are sandwiched or interposed a layer or blanket of insulating material such as mineral wool or glass fibre and a layer or ply of reinforcing material, the latter having attached thereto an electric heater or heaters in the form of insulated wire, the whole assembly being secured together by stitching, stapling or in any other suitable manner with provision for connecting the heater means to a source of current supply. Alternatively, one of the outer layers may be composed of metal, in which event the heater elements are secured thereto and the waterproof character of the sheeting or tarpaulin is maintained, as in the first embodiment. The subject matter of this alternate embodiment is not claimed herein but is claimed in a divisional application.

In order that the invention may be fully and clearly comprehended the same will now be described with reference to the accompanying drawings, in which:

FIGURE 1 is a perspective sectional view of a fragmental portion of a covering or laminate of the invention.

FIGURES 2 and 3 are fragmental cross-sections of details of the waterproof covering of the invention.

FIGURE 4 is a diagrammatic plan—drawn to small scale—of a modification of the invention.

FIGURE 5 is a perspective view of the covering, shown in FIGURE 4, applied to a block of material during use.

Referring to FIGURE 1, two primary members of suitable strong, synthetic thermoplastic, flexible sheet material to form outer layers 1, 1, are provided, the material being waterproof. For instance, the said outer layers may be composed of stout polyvinylchloride sheet material and either or both of the outer layers may be reinforced by an additional fabric layer laminated thereto. One manner of reinforcing the outer sheet material is by adhesively bonding or otherwise securing thereto a layer of woven or knitted fabric such as hessian, jute or linen 2 (see FIGURE 2). The interposing and bonding of such woven fabric 2 between the two layers of plastic sheet material 1B and 1A is illustrated in FIGURE 3.

Also, sandwiched and or interposed between the outer layers 1, 1, with or without reinforcing 2, is a layer or ply of suitable inorganic fibrous insulating material 4, such as mineral wool blanket material or glass fibre, these fibres being held together by a layer of open-mesh woven, knitted or netted textile material 5.

Attached to one side of the last-mentioned layer is a heater element or elements 6 in the form of electric wiring furnished with a covering of suitable insulating material. The said element or elements may be bonded, stitched, stapled or otherwise attached as desired.

The aforesaid assembly of superimposed layers or plies are subsequently secured together in any preferred manner. For instance, the assembly may have a row or rows of stitching 7 inserted close to the perimeter and/or at any other part if desired.

Provision is made at 12 in the finished article for connecting the heater means to a suitable source of electric current supply, along with control means. If desired, temperature indicator and thermostatic devices may be included in the circuitry.

It must be understood that instead of the outer layers 1, 1, of articles according to the invention being of plastic sheet material such as described, either or both may be composed of suitable woven or knitted fabric which would be waterproofed in any conventional manner.

When in use, the aforesaid device or laminate may be used either to cover or enclose merchandise or articles which are intended to be maintained at predetermined temperature, whereupon current from a convenient source is switched on and controlled according to the requirement of a user.

The material according to the invention may be constructed in rectangular or any other suitable shape for covering flat and similar surfaces. In order to facilitate the heating use of the present tarpaulin on piles of goods, boxes, blocks or like objects, the tarpaulin as shown in FIGURE 4 may be provided with strapping openings for fastener means such as the eyelets 10 and the laces. The heating tarpaulin adapted for strapping is also provided with flaps 8, as shown in FIGURE 4 and it is contemplated that additional fastening means may be used, such as straps and buckles or clips. The tarpaulin which is illustrated in FIGURE 4 diagrammatically illustrates the electrically heated, multiple ply covering material in a flat state with the eyelets arranged at an outer folded edge and an inner folded edge respectively, whereby the bottom edge of the embodiment illustrated in FIGURE 4 is tucked under the top edge when the flat material is folded in rectangular form for lacing. The laces 11 are brought through the openings at the front and at the top in the manner shown in FIGURE 5 which also shows the manner of inwardly folding the end flap 8 of the material to surround and completely enclose a rectangular block representing the goods which are being heated.

In order to heat the electrical tarpaulin of the present invention and as shown in FIGURE 1, provision is made at 12 for supplying and controlling electric current to the heater element or elements 2 and, if desired, means for indicating temperature (not shown) and thermostate means for predetermining the latter (not shown) may also be employed.

When metal film is employed for one of the outer members the cover may be rolled for storage or transportation.

Breather means may also be included in the waterproof covers in the form of suitably disposed vents which vents may incorporate one-way valve means (not shown). Thus, any steam or vapour created by the use of the cover may escape by way of certain valves and air may enter by other valves to prevent condensation upon the inner face of the cover.

Covers according to the invention may be constructed so as to lie flat upon a concerete surface, for instance. Alternatively, the covers may be designed for enclosing articles such as pillars, walls and such like members.

In the last-mentioned event the covers may be provided with securing means such as eyelets, clips or straps as already referred to with reference to FIGURES 1–5.

In instances where it is desired to prevent direct contact of the heated face of the electrically heated tarpaulin material of the invention with concrete or like substance.

spacers (not shown) may be provided upon the face of the material.

I claim:

1. An electrically heated covering in the form of a substantially rectangular flat assembly which is adapted to wrap and completely enclose articles and materials at elevated temperatures to aid the curing and hardening of materials such as concrete and to aid the preserving, storage and seasoning of materials such as timber or other articles harmed at low temperatures, said covering assembly comprising top and bottom water-impervious synthetic plastic sheets which are joined together at their marginal edges to form a waterproof envelope, said outer top and bottom plastic sheets each being laminated and being reinforced on the inside by a layer of woven textile fabric bonded thereto, a filling of mineral fibrous insulation which is disposed as a layer between said top and bottom water-impervious laminated plastic sheets to constitute an insulation batting within said assembly, heating elements in the form of insulated electrical wiring, said wiring being secured within the interior of the assembly to distribute heat within the assembly, the side edges of said rectangular assembly being provided with projecting flaps which are of generally rectangular shape and have a width less than the width of the assembly, an electrical inlet connector adapted to be fitted into a source of electrical current supply and said top and bottom sheets being provided with a row of eyelets located at the outer edge of one side and with a corresponding row of eyelets located along an inner line parallel to the opposite edge, whereby the side flaps can be turned in and the assembly can be wrapped around an article to place the eyelets of one edge in alignment with the corresponding eyelets adjacent the other edge to adapt the assembly for lacing.

2. An electrically heated assembly as claimed in claim 1, wherein said fibrous mineral insulation is glass wool.

3. An electrically heated assembly as claimed in claim 1, wherein said fibrous mineral insulation is mineral wool.

References Cited

UNITED STATES PATENTS

| | | | |
|---|---|---|---|
| 2,802,091 | 8/1957 | MacKendrick | 219—529 |
| 2,873,352 | 2/1959 | Franco | 219—528 |
| 2,938,992 | 5/1960 | Crump | 219—528 |
| 3,031,739 | 5/1962 | Boggs | 219—345 X |
| 3,130,289 | 4/1964 | Katzman et al. | 219—528 X |
| 3,213,521 | 10/1965 | Owers | 29—155.63 |

RICHARD M. WOOD, *Primary Examiner.*

V. Y. MAYEWSKY, *Assistant Examiner.*